US012706762B2

(12) United States Patent
Bertin et al.

(10) Patent No.: US 12,706,762 B2
(45) Date of Patent: Aug. 11, 2026

(54) METHOD FOR DETERMINING AN AUTHORIZATION TO IMPLEMENT A COMPOSITE RESOURCE, BLOCKCHAIN, DEVICES AND CORRESPONDING PROGRAM

(71) Applicant: Orange, Issy-les-Moulineaux (FR)

(72) Inventors: Emmanuel Bertin, Chatillon Cedex (FR); Julien Hatin, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 409 days.

(21) Appl. No.: 18/065,522

(22) Filed: Dec. 13, 2022

(65) Prior Publication Data

US 2023/0188368 A1 Jun. 15, 2023

(30) Foreign Application Priority Data

Dec. 14, 2021 (FR) ...................................... 2113516

(51) Int. Cl.
*H04L 9/00* (2022.01)
*H04L 9/32* (2006.01)

(52) U.S. Cl.
CPC .............. *H04L 9/50* (2022.05); *H04L 9/3265* (2013.01)

(58) Field of Classification Search
CPC ................................ H04L 9/3265; H04L 9/50
See application file for complete search history.

(56) References Cited

U.S. PATENT DOCUMENTS

| | | | | |
|---|---|---|---|---|
| 10,824,747 | B1 * | 11/2020 | Magerkurth | G06F 21/6209 |
| 10,833,865 | B2 * | 11/2020 | Kelly | H04L 9/3239 |
| 10,841,082 | B2 * | 11/2020 | Ben-Ari | H04L 63/0428 |
| 11,556,925 | B2 * | 1/2023 | Deshpande | H04L 9/30 |
| 12,271,894 | B2 * | 4/2025 | Hennebert | G06Q 20/401 |
| 12,393,664 | B1 * | 8/2025 | Liang | G06F 16/1805 |

(Continued)

OTHER PUBLICATIONS

Mohanta, Bhabendu Kumar et al., "An Overview of Smart Contract and Use Cases in Blockchain Technology", 2018 9th International Conference on Computing, Communication and Networking Technologies (ICCCNT), IEEE, Jul. 10, 2018, pp. 1-4.

(Continued)

*Primary Examiner* — Gary S Gracia
(74) *Attorney, Agent, or Firm* — Knobbe, Martens, Olson & Bear, LLP

(57) ABSTRACT

A method for determining an authorization to implement a composite resource, the composite resource including at least two resources. The method is implemented within a blockchain and includes: receiving by a smart contract, called a composite contract, a query from a requesting entity desiring to obtain an authorization to implement the composite resource; obtaining, by the composite contract, addresses of smart contracts within a blockchain, the smart contracts being associated with resources included in the composite resource; and, for each smart contract: transmitting a query for authorization to implement the resource associated with this smart contract; receiving a result provided by this smart contract; and compiling results coming from a smart contract delivering a result representative of the authorization to implement the composite resource.

10 Claims, 2 Drawing Sheets

(56) References Cited

U.S. PATENT DOCUMENTS

| | | | | |
|---|---|---|---|---|
| 12,579,541 | B2 * | 3/2026 | English | G06F 16/2379 |
| 2019/0087446 | A1 * | 3/2019 | Sharma | H04L 9/3239 |
| 2019/0188654 | A1 * | 6/2019 | Albrecht | G06Q 10/06313 |
| 2019/0334726 | A1 * | 10/2019 | Kelly | H04L 9/3247 |
| 2020/0034448 | A1 * | 1/2020 | Sato | H04L 9/50 |
| 2020/0119905 | A1 * | 4/2020 | Revankar | G06Q 20/06 |
| 2020/0177579 | A1 * | 6/2020 | Allen | H04L 9/3239 |
| 2020/0364703 | A1 * | 11/2020 | Joveski | H04L 9/50 |
| 2021/0021597 | A1 * | 1/2021 | Salman | H04L 63/0823 |
| 2021/0126794 | A1 * | 4/2021 | Forrester | G06F 21/64 |
| 2021/0157798 | A1 * | 5/2021 | Yu | G06F 21/604 |
| 2021/0165686 | A1 * | 6/2021 | Yang | G06Q 20/02 |
| 2021/0326187 | A1 * | 10/2021 | Muskal | H04L 9/0891 |
| 2021/0349770 | A1 * | 11/2021 | Fang | G06F 21/645 |
| 2023/0188368 | A1 * | 6/2023 | Bertin | H04L 9/50 713/168 |
| 2023/0254265 | A1 * | 8/2023 | O'Connor | H04L 9/3247 |
| 2024/0004709 | A1 * | 1/2024 | Poornachandran | G06F 9/5027 |
| 2024/0185221 | A1 * | 6/2024 | Cheng | G06F 16/27 |
| 2024/0214228 | A1 * | 6/2024 | Huntley | H04L 9/3239 |

OTHER PUBLICATIONS

Pérez, Víctor et al., "Cost Analysis of Smart Contracts Via Parametric Resource Analysis", Jan. 13, 2021, arxiv.org, pp. 7-31.

Written Opinion on the Patentability of the Invention for French Application No. 2113516 dated Jul. 28, 2022.

* cited by examiner

[Fig. 1]
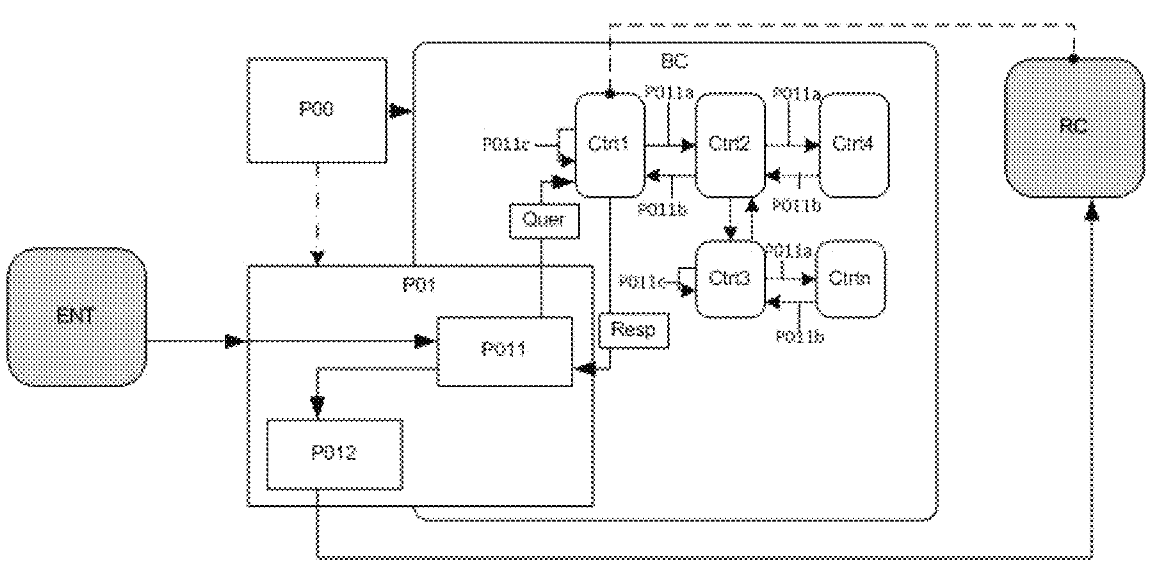
[Fig. 2]
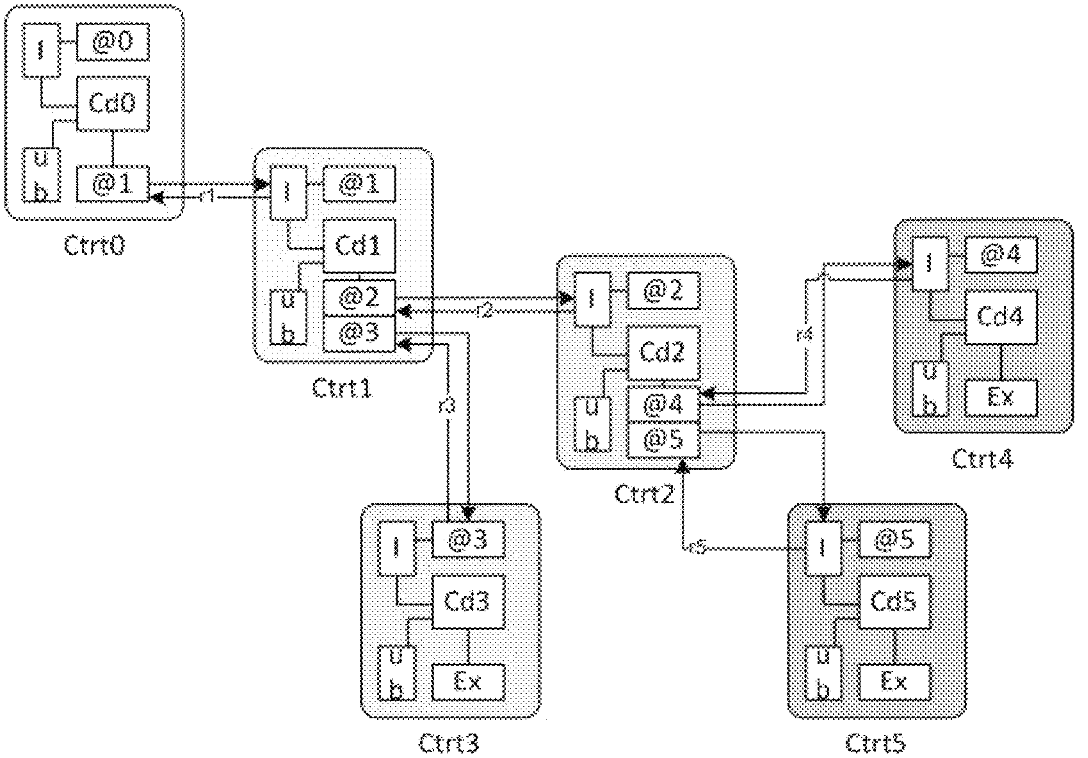

[Fig. 3]
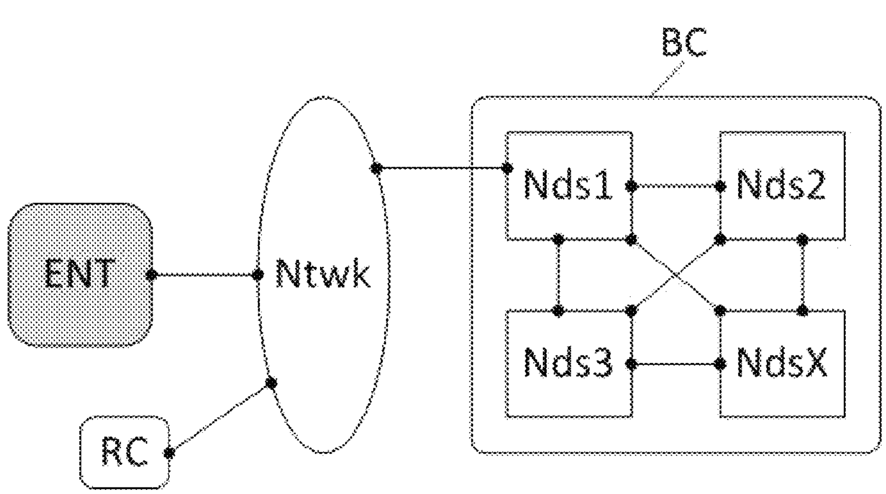

METHOD FOR DETERMINING AN AUTHORIZATION TO IMPLEMENT A COMPOSITE RESOURCE, BLOCKCHAIN, DEVICES AND CORRESPONDING PROGRAM

CROSS-REFERENCE TO RELATED APPLICATIONS

This application claims foreign priority to French Patent Application No. FR 2113516, entitled "METHOD FOR DETERMINING AN AUTHORIZATION TO IMPLEMENT A COMPOSITE RESOURCE, BLOCKCHAIN, DEVICES AND CORRESPONDING PROGRAM" and filed Dec. 14, 2021, the content of which is incorporated by reference herein in its entirety.

INCORPORATION BY REFERENCE TO ANY PRIORITY APPLICATIONS

This application claims foreign priority to French Patent Application No. FR 2113516, entitled "METHOD FOR DETERMINING AN AUTHORIZATION TO IMPLEMENT A COMPOSITE RESOURCE, BLOCKCHAIN, DEVICES AND CORRESPONDING PROGRAM" and filed Dec. 14, 2021, the content of which is incorporated by reference herein in its entirety.

BACKGROUND

Field

The disclosure relates to the implementation of resources. More particularly, the disclosure relates to the implementation of hardware or software resources. In the following, it is considered that a hardware or software resource is able to perform an action or render a service. One object of the present disclosure is to propose a method for implementing these resources that preserves the rights of the owners of the resources, particularly in a configuration where multiple resources must be implemented in a concomitant or nested manner.

Description of Related Art

With the advent of systems consisting of software and hardware elements coming from different manufacturers and/or publishers, the question of access rights to the components of a system or of an object arises. Indeed, it is very common that an apparatus or that a system comprises, uses or implements many components that are not directly or indirectly manufactured by the manufacturer of the apparatus or of the system. It is also common that these components are provided with a certain number of operational implementation conditions. Yet, determining an authorization to implement a component is not an easy thing. Problems of this type arise in many scenarios. For example, the following cases can be cited:

- Updating of a software element in a global system (for example firmware of a telephone or of any electronic device): which software element is to be used, for which terminal or for which electronic device, in which context;
- Authorization to replace physical or software components in an object (such as for example a communication terminal, a car, or an aircraft): which component to use, in which limit, for what use?
- Analysis of a software license to use (CC, MIT, GNU, GPL, etc.): which license to use, how does this license combine with other licenses, etc.

The generalization of all these problems may be perceived as a problem of access control to a resource. More particularly, this general problem consists in determining and qualifying the rights that a system possesses for implementing a resource integrated within this system. In other terms, it is possible to generalize these problems with the possession of sufficient rights to perform the implementation of a resource: is the multi-component system in possession of the rights needed to implement a given action on a given resource.

In the current prior art, this problem is, on the one hand, generally addressed in a centralized manner, upstream, by the designer of the multi-component system; and, on the other hand, is subject to a multiplicity of bilateral agreements between the designer of the system and the various designers or publishers of components to be integrated. The effect of these agreements is the integration, upon designing the system, of conditions wherein the components may, or may not, be implemented within this system.

Nevertheless, it is increasingly common that the manufacturers of systems or of components want, or are constrained, to provide in real time on-demand functionalities. Such a real-time provision makes the static and centralized model of the prior art increasingly difficult to implement.

SUMMARY

The inventors have kept the existing problems in mind during the design and development of the proposed solution. More particularly, the technique described was designed to be able to obtain data relating to the implementation of a composite resource. More particularly, it is proposed a method for determining an authorization to implement a composite resource, said composite resource comprising at least two resources, said method being implemented within a blockchain. Such a method comprises:

- a step of receiving, by a smart contract of the blockchain, called composite contract, a query coming from a requesting entity desiring to obtain an authorization to implement the composite resource;
- a step of obtaining, by the composite contract, at least one address of at least one smart contract within a blockchain, said at least one smart contract being associated with at least one resource included in said composite resource; and, for each smart contract:
- a step of transmitting a query for authorization to implement the resource associated with this smart contract; and
- a step of receiving a result provided by this smart contract;
- a step of compiling results coming from said at least one smart contract delivering a result representative of the authorization to implement the composite resource.

Thus, it is possible to obtain an authorization to implement a resource in real time, in a reliable, open and secure manner.

According to a particular feature, prior to the step of receiving the query, a step of inserting, within at least one blockchain, said at least one smart contract and the composite contract addressing said at least one smart contract.

Thus, it is possible to easily define composite resources that may comprise a plurality of resources, which themselves agglomerate other resources, all the smart contracts associated with these various unitary or agglomerated resources, being able to be located in different blockchains, being accessible via their respective addresses within these blockchains.

According to a particular feature, the query coming from the requesting entity comprises at least one data representative of an action that the requesting entity wants the composite resource to implement.

Thus, depending on the action required by the requesting entity, the smart contracts associated with the resources included in the composite resource may determine whether or not they accept the implementation query from the requesting entity.

According to a particular feature, the query coming from the requesting entity comprises at least one data representative of certification data.

Thus, it is possible to authenticate the requesting entity

According to a particular feature, the method further comprises a step of inserting, within the blockchain of the composite contract, a transaction comprising said certification data.

Thus, it is possible to track, for a subsequent use or review, the materiality of the query transmitted by the requesting entity According to a particular feature, the certification data is the result of a cryptographic function applied on a symmetric key Ka and on data DCP in possession of the requesting entity.

According to a particular feature, the method comprises, after obtaining, by the requesting entity, the result representative of the authorization to implement the composite resource, a step of transmitting, by the requesting entity, an implementation query to said composite resource, taking into account the result representative of the authorization to implement the composite resource.

According to a particular feature, the method comprises, after transmitting the result representative of the authorization to implement the composite resource to the requesting entity:

- a step of receiving, by the blockchain, coming from the composite resource, a query for obtaining implementation authorization data;
- and, when such implementation authorization data is present within the blockchain, a step of transmitting the implementation authorization data to the composite resource.

According to another aspect, the development also relates to a blockchain comprising means for determining an authorization to implement a composite resource, said composite resource comprising at least two resources. Such a chain comprises:

- means for receiving, by a smart contract of the blockchain, called composite contract, a query coming from a requesting entity desiring to obtain an authorization to implement the composite resource;
- means for obtaining, by the composite contract, at least one address of at least one smart contract within a blockchain, said at least one smart contract being associated with at least one resource included in said composite resource; and, for each smart contract:
- means for transmitting a query for authorization to implement the resource associated with this smart contract; and
- means for receiving a result provided by this smart contract;
- means for compiling results coming from said at least one smart contract delivering a result representative of the authorization to implement the composite resource.

The development also relates to all nodes of a blockchain comprising all or part of the features that may be implemented within the blockchain according to the preceding claims.

According to a preferred implementation, the various steps of the methods according to the present disclosure are implemented by one or more software or computer programs, comprising software instructions intended to be executed by a data processor of an execution terminal according to the present technique and being designed to control the execution of various steps of the methods, implemented at a communication terminal, from a remote server and/or from a blockchain, within the scope of a distribution of the processes to be carried out and determined by a scripted source code or a compiled code.

Consequently, the aim of the present technique is also programs, likely to be executed by a computer or by a data processor, these programs including instructions to control the execution of steps of the method such as mentioned above.

A program may use any programming language, and be in the form of source code, object code, or byte code between source code and object code, such as in a partially compiled form, or in any other desirable form.

The aim of the present technique is also an information medium that can be read by a data processor, and including instructions of a program such as mentioned above.

The information medium may be any entity or terminal capable of storing the program. For example, the medium may include a storage means, such as a ROM, for example a CD ROM or a microelectronic circuit ROM, or also a magnetic recording means, for example a mobile medium (memory card) or a hard drive or an SSD.

On the other hand, the information medium may be a transmissible medium such as an electrical or optical signal, which may be routed via an electrical or optical cable, by radio or by other means. The program according to the present technique may in particular be downloaded on an Internet type network.

Alternatively, the information medium may be an integrated circuit wherein the program is incorporated, the circuit being adapted to execute or to be used in the execution of the method in question.

According to one embodiment, the present technique is implemented by means of software and/or hardware components. In this regard, the term "module" may correspond in this document to a software component as well as to a hardware component or to a set of software and hardware components.

A software component corresponds to one or more computer programs, one or more sub-programs of a program, or more generally to any element of a program or of software capable of implementing a function or a set of functions, according to what is described below for the module concerned. Such a software component is executed by a data processor of a physical entity (terminal, server, gateway, set-top-box, router, etc.) and is likely to access the hardware resources of this physical entity (memories, recording media, communication bus, input/output electronic cards, user interfaces, etc.).

In the same manner, a hardware component corresponds to any element of a hardware assembly capable of implementing a function or a set of functions, according to what is described below for the module concerned. This may concern a hardware component that can be programmed or with an integrated processor for executing software, for example an integrated circuit, a chip card, a memory card, an electronic card for executing firmware, etc.

Each component of the system described above of course implements its own software modules.

The various embodiments mentioned above can be combined with one another for the implementation of the present technique.

BRIEF DESCRIPTION OF THE DRAWINGS

Other aims, features and advantages of the disclosure will become more apparent upon reading the following description, given by way of simple illustrative, and non-limiting examples, in relation to the figures, wherein:

FIG. 1 shows the method for implementing a composite resource via a blockchain;

FIG. 2 shows a hierarchy indicative of smart contracts according to the disclosure;

FIG. 3 shows a simplified physical architecture of a system wherein the methods described above may be implemented.

DETAILED DESCRIPTION OF CERTAIN EMBODIMENTS

Reminders of the Principle

As previously disclosed, the technique proposed by the inventors consists in carrying out a compilation of data for processing resources, the effect of this compilation being to deliver compiled data for authorization (or absence of authorization) to implement a resource comprising/using a plurality of resources. In the following, a resource implementing a plurality of resources is named composite resource. A composite resource consists of a plurality of resources, which may themselves be composite resources or unitary resources. As previously indicated, a problem arises of obtaining, in real time, the conditions in which a composite resource may be implemented. The technique that was developed by the inventors makes it possible for such an obtaining in a secure, certain, and transparent manner. To achieve this result, a blockchain (or distributed database) is used to store on the one hand conditions for implementing unitary resources and on the other hand conditions for implementing composite resources. FIG. 1 explains the general steps of the proposed method.

In a first phase (P00), referred to as initialization, smart contracts (Ctrt1, etc., Ctrtn) are created, within the blockchain (BC), for the composite resource of which we want to manage the rights. As previously disclosed, this resource may be a hardware resource (i.e., a physical component installed within a device) or a software resource (i.e., a software component installed within an application or program) or a mixed resource combining hardware resources and software resources.

The creation of the smart contract is carried out by the entity holding the unitary resource, that is to say the entity owning the resource and/or the entity managing the rights of the unitary resource: a plurality of smart contracts is therefore created (Ctrt4, etc., Ctrtn), typically one for each unitary resource. Then smart contracts are created to combine a plurality of unitary resource smart contracts (Ctrt1, Ctrt2, Ctrt3): this concerns so-called agglomeration contracts for convenience. These agglomeration contracts that combine a plurality of resources are particular in that they comprise, in their structure, a compilation function that is used to compile the authorization results received from the smart contracts that they reference (i.e. the smart contracts of the sub-resources that they agglomerate). Once this initialization has been carried out, the smart contract Ctrt1 of the composite resource RC (called for convenience "composite contract") is accessible in the blockchain. It is public when the blockchain is public. The composite contract Ctrt1 is a particular agglomeration contract (of level 0) making it possible to address the composite resource in its entirety.

Then, subsequently, a method for implementing (P01) the composite resource is executed, within the blockchain, when an entity (for example a connected device, an application, etc.) wants to implement the composite resource; this method, from the point of view of the requesting entity, comprises two phases: a query phase (P011), wherein the entity queries (Quer), with the composite contract (Ctrt1), an implementation authorization for the composite resource referenced by the contract and a phase for implementing (P012) the composite resource (RC), which occurs depending on the response (Resp) provided by the composite contract (Ctrt1). From the point of view of the blockchain, this method mainly comprises the query phase (P011), which starts with the receipt of the query (Quer) request and ends (at least partially) with providing the response (Resp) to the requesting entity.

Thus, for a connected device, for example, the method consists in obtaining the authorization to implement the components (software or hardware) that constitute it, for example in a given situation. By way of purely illustrative example, a connected vehicle wants, at the request of its user, to implement an energy reserve at its disposal in a given situation. The connected vehicle initiates the implementation of the method for obtaining authorization with the blockchain in order to obtain (or not) this authorization. By way of another example, an application being executed on a communication terminal wants to implement a particular cryptographic function of a Secure Element (SE) integrated within the communication terminal, the secure element integrating a plurality of unitary functions. The communication terminal initiates the implementation of the method for obtaining authorization with the blockchain in order to obtain (or not) this authorization.

The method implemented within the blockchain consists, for a composite contract (Ctrt1), associated with the composite resource (RC), in:

receiving (P011) a query (Quer) coming from the requesting entity ENT (that wants to implement the composite resource); then, recursively and/or iteratively in:

receiving (P011_b_) the implementation authorization query (reqn) results (resn) that it transmits (P011_a_), directly or indirectly, to all of the smart contracts (Ctrt2, etc., Ctrtn), (which are themselves associated with composite resources or with unitary resources)

then in:

compiling (P011_c_) these results (resn) to provide a result (Resp) to the requesting entity ENT.

For greater clarity, the steps are numbered identically in FIG. 1, although these steps are effectively different from one contract to another. Thus, it is possible to obtain, in an automatic, transparent, decentralized manner and in real time, an authorization to implement the composite resource that respects the provisions made by the manufacturer, the owner or the publisher of each resource constituting the composite resource.

Once in possession of this result, the requesting entity may request the implementation (P012) of the composite resource (when the result received makes this implementation quite obviously possible). For example, this phase (P012) may comprise a step of transmitting, by the requesting entity, a query to implement the action to the composite resource, this implementation query comprising, as parameter, the action that was validated or authorized by the blockchain, as well as the result received (resp) and data for identifying the requesting entity. Upon receipt of this implementation query, the composite resource implements the requested action (and optionally returns an implementation result to the requesting entity). Optionally, the composite resource subsequently addresses its composite contract within the blockchain and requires the inscription of a transaction within the blockchain for the requesting entity and for the action implemented by the composite resource.

Creation and Identification of Resources in a Blockchain

Prior to the implementation of a composite resource, it is assumed that this composite resource has been subjected to an inscription in a blockchain. This composite resource, as previously indicated, comprises at least two resources, these two resources being able, optionally, to be either unitary and/or composite resources. Thus, a composite resource may for example comprise two composite resources and a unitary resource.

In a purely illustrative example, a "connected camera" composite resource may comprise a "CCD sensor" unitary resource and an "image capture module" composite resource, this composite resource comprising for example an "SDR image capture module" resource and an "HDR image capture module" resource. According to the development, as previously summarized, these various resources are subject to an inscription in the blockchain. More particularly, in a particular embodiment, these resources are individually inscribed within the blockchain in the form of a smart contract associated with each of the resources. In the preceding example, it is introduced into the blockchain a smart contract for the "HDR image capture module", a smart contract for the "SDR image capture module", a smart contract for the "image capture module", a smart contract for the "CCD sensor" and a smart contract for the "connected camera". It is the holder of the rights/manufacturer who inserts the smart contract relating to the resource within the blockchain. This smart contract associated with the resource comprises on the one hand an identifier of the resource and on the other hand conditions for implementing this resource.

These conditions for implementing the resource may be either in the form of an executable code (byte, compiled code, or scripted code for example) and/or an interface for communicating (direct or indirect) with the owner and/or the manufacturer of the resource, or also and interface for communicating with the resource itself depending on embodiments and operational implementation conditions.

The smart contract associated with a resource (composite or unitary) discloses at least one standardized interface, named "Authorized", which, when it is invoked, transmits the conditions for implementing the resource to which the smart contract refers for an action passed as parameter of this invocation. For a composite resource, the smart contract further comprises at least one function for querying the smart contracts associated with the resources integrated within the composite resource.

Thus, by taking the preceding example, the manufacturer of the "HDR image capture module" inserts, into the blockchain, a smart contract comprising an identification of the resource and an "Authorized" authorization requesting interface, which takes as parameter an action value, for which it wants to obtain an authorization.

The manufacturer of the "image capture module" (who may be the same as the manufacturer of the HDR image capture module) inserts, into the blockchain, a smart contract comprising an identification of the resource and an "Authorized" authorization requesting interface, which takes as parameter an action value.

At the end of this plurality of contract insertions within the blockchain, each owner/manufacturer of resources has, for the contracts that they have inserted, an address attached to this contract, within the blockchain.

This contract may be associated with the element to which it is attached by inscribing therein a unique identifier such as a serial number. The contracts have references of each of the resources in the form of a sequenced list.

This smart contract possesses at least one function making it possible to define the conditions of use. This function is a space reserved for the owner of the resource and who may inscribe therein the code that they want. It can be cited for example:

- Verifying in the case of a license the compliance with the terms of their license in the other resources;
- Querying a third-party service to verify the use rights (for example a payment);
- Issuing an event to prepare a particular use.

This function may be dependent on a cryptographic token transaction.

This function takes as argument at least the address of the invoker. This function may issue an authorization token. These authorization tokens are created by passing as parameters an address identifying the owner and an address identifying the smart contract associated with the resource.

Implementation of a Composite Resource

When all of the smart contracts associated with the resources are created and addressed within the blockchain, we therefore have within this blockchain a hierarchy of contracts, which may be seen, for a given composite resource, as a tree of contracts that comprises addresses to nodes, these nodes themselves being able to comprise other addresses to other nodes (in recursive mode) and so on.

Consequently, it is possible to implement the composite resource associated with this contract hierarchy by executing the following method.

General Implementation Method

The method implemented is the following:

An entity (i.e. an application, firmware, a device, etc.) wants to implement a composite resource (this implementation may consist in simply using the resource—for example use of the connected camera the example of which is presented above—, or also in using a particular function of the resource, for example for implementing a specific function of the resource, in a given situation—for example use of extra power in a vehicle or use of a graphic card processor for particular purposes). In any case, this entity queries, in the blockchain, via the "Authorized" authorization requesting interface, the level 0 smart contract that is referenced for this composite resource.

This level 0 smart contract comprises, as previously indicated, a query function, coded, which has the plurality of addresses of lower-level components. This plurality of addresses of lower-level components may for example be in the form of a sequenced list or also for example in the form of a recursive structure, or also any other suitable structure. Moreover, the plurality of addresses of lower-level components may only comprise one single address.

In any case, for each address referenced with this level 0 smart contract, the method comprises a step of invoking the associated "Authorized" authorization requesting interface. The invocation of this interface brings about, at the level 1 smart contract invoked, processing that is:

either processing identical to that of the level 0 contract, if the resource associated with the level 1 smart contract is also a composite resource (thus this concerns a recursive implementation);

or processing consisting simply in obtaining an authorization request result relating to the action passed as parameter of the authorization query.

In relation with FIG. 2, a purely illustrative example of sequencing of smart contracts within one (or more) blockchain(s) is described. Indeed, according to the present technique, the contracts may be distributed in a plurality of different blockchains. However, this does not change the implementation of the method described.

In this example, the level 0 smart contract comprises, within a block of the blockchain, an "Authorized" authorization requesting interface (I), an address (@0), an executable code (Cd0), an address (@1) of a level 1 smart contract and data for updating this smart contract (ub). The presence of this address (@1) of the level 1 smart contract makes this contract Ctrt0 a contract relating to a composite resource. During the execution of the authorization request, the executable code (Cd0) activates the authorization requesting interface (I) of the level 1 smart contract, referenced at the address (@1), by passing as parameter the value of the requested authorization: this activation results in the result (r1) being obtained associated with this authorization value coming from the contract of the level 1 smart contract Ctrt1 and providing this result to the invoker.

The level 1 smart contract Ctrt1 comprises, within a block of the blockchain, an "Authorized" authorization requesting interface (I), an address (@1), an executable code (Cd1), two addresses (@2 and @3) of level 2 smart contracts and data for updating this smart contract (ub). During the execution of the authorization request, the executable code (Cd1) activates the authorization requesting interface (I) of the level 2 smart contract, referenced at the address (@2) and activates the authorization requesting interface (I) of the level 2 smart contract, referenced at the address (@3), by passing as parameter the value of the requested authorization: these two activations result in two results (r2, r3) being obtained, one coming from the smart contract Ctrt 2 and the other coming from the smart contract Ctrt3. As the level 1 smart contract Ctrt1 activates two level 2 smart contracts (Ctrt2 and Ctrt3), these two results (r2, r3) that were obtained are compiled to provide the result r1 transmitted to the smart contract Ctrt0.

The level 2 smart contract Ctrt2 also referencing a composite resource, comprises, within a block of the blockchain, an "Authorized" authorization requesting interface (I), an address (@2), an executable code (Cd2), two addresses (@4 and @5) of level 3 smart contracts and data for updating this smart contract (ub). During the execution of the authorization request, the executable code (Cd2) activates the authorization requesting interface (I) of the level 3 smart contract, referenced at the address (@4) and activates the authorization requesting interface (I) of the level 3 smart contract, referenced at the address (@5), by passing as parameter the value of the requested authorization: these two activations result in two results (r4, r5) being obtained, one coming from the smart contract Ctrt4 and the other coming from the smart contract Ctrt5. As the level 2 smart contract Ctrt2 activates two level 3 smart contracts (Ctrt4 and Ctrt5), these two results (r4, r5) that were obtained are compiled to provide the result r2 transmitted to the smart contract Ctrt1.

The level 2 smart contract Ctrt3 comprises, within a block of the blockchain, an "Authorized" authorization requesting interface (I), an address (@3), an executable code (Cd3), and data for updating this smart contract (ub). During the execution of the authorization request, the executable code (Cd3) carries out an authorization computation depending on the parameter passed to the authorization requesting interface and returns a result. For this, this smart contract Ctrt3 may call upon an external entity, by means of a suitable interface (Ex). This external entity may, depending on alternative embodiments, either be the unitary resource to which this smart contract Ctrt3 relates, or another entity, which is responsible for providing the smart contract Ctrt3 with the data necessary for compiling the response that it must transmit to the requesting smart contract (in this case in this example the contract Ctrt1).

The level 3 smart contracts Ctrt4 and Ctrt5 each comprise, within a block of the blockchain, an "Authorized" authorization requesting interface (I), an address (@4, @5), an executable code (Cd4, Cd5), and data for updating this smart contract (ub). During the execution of the authorization request, the executable code (Cd4, Cd5) carries out an authorization computation depending on the parameter passed to the authorization requesting interface and returns a result. For this, these smart contracts Ctrt4 and Ctrt5 may call upon an external entity, by means of a suitable interface (Ex). This external entity may, depending on alternative embodiments, either be the unitary resource to which this smart contract relates, or another entity, which is responsible for providing the smart contract with the data necessary for compiling the response that it must transmit to the requesting smart contract (in this case in this example the contract Ctrt2).

As previously explained, the executable code of smart contracts, particularly those disclosed in the preceding example, therefore comprise a function for iteratively and/or recursively querying the contracts that they reference in order to obtain the results to the query requests coming from these referenced contracts and a function for compiling the results obtained coming from these smart contracts, which makes it possible for the contract to itself provide a result to the invoker. The function of compiling the results obtained may be different for each contract, depending on the operational implementation conditions. In a way, this compilation function fulfils a decision-making role, and it materializes the smart contract consensus. The function may be a decision-making function (min, max, majority vote) and return an acceptance or rejection boolean result to the transmitted query. It may also take the form of a function also sending back a composite result, referencing the various implementation authorization acceptances and the various implementation authorization rejections, so as to make it possible for the invoker (that which for example invokes the level 0 smart contract) to decide how to take into account the results provided by the various contracts associated with the various resources.

When the invoker obtains the result coming from the smart contract that it invoked in the blockchain for the targeted composite resource, it keeps this result and transmits it to the composite resource when it wants to implement it for the action targeted as parameter of the query initially transmitted to the smart contract of the composite resource.

This result is subsequently transmitted to the composite resource in question when the composite resource is implemented by the invoker. More particularly, the result may for example take a binary value that is determined, within the composite contract, depending on the decision-making function implemented within the composite contract: when the function is "min" it is sufficient that only one smart contract of the set of contracts gives the authorization for it to be granted. When the function is "max" all of the smart contracts of the composite contract should give their agreement. Other functions may induce more staggered results, such as "strictly reject", "minor reject", "accept", "strong accept". For example "strictly reject" may be a complete rejection whereas "minor reject" may be associated with a partial use of a resource.

In other terms, by taking the illustrative examples provided above (for creating and identifying resources in the blockchain), when the contract of the image capture module is invoked by an invoker (i.e. by the connected camera that wants to implement this "image capture module" resource or by another contract), to determine whether an action to be carried out on this resource is permitted, the invoker invokes the "Authorized" authorization requesting interface and passes as parameter the action that it wants to perform (for example "use" for an action to use this resource). As this concerns a composite resource, according to the present, the method for determining the recursive or iterative implementation authorization described above is executed by the contract associated with the composite resource.

Thus, when the contract of the "HDR image capture module" is invoked by the contract of the "image capture module" composite resource, to determine whether this "use" action to be performed on this resource is permitted, the contract of the composite resource invokes the "Authorized" authorization requesting interface and passes as parameter the "use" action for an action to use the resource. The contract of the "HDR image capture module" executes its code and provides the result associated with the contract of the "image capture module" composite resource.

Likewise, when the contract of the "SDR image capture module" is invoked by the contract of the "image capture module" composite resource, to determine whether this "use" action to be performed on this resource is permitted, the contract of the composite resource invokes the "Authorized" authorization requesting interface and passes as parameter the "use" action for an action to use the resource. The contract of the "SDR image capture module" executes its code and provides the result associated with the contract of the "image capture module" composite resource.

Upon receipt of the results coming from the two contracts (of the "HDR image capture module" and of the "SDR image capture module"), the contract of the "image capture module" carries out a compilation of these results and transmits the compiled result to the invoking contract (in this case the smart contract of the "connected camera" composite resource. The function for compiling the contract makes it possible to determine which will be the result of the query. For example if the compilation function of the "image capture module" contract sends back a boolean the value of which is "1", the smart contract of the "connected camera" composite resource understands that it is able to use the "image capture resource" and does not care about which technology is effectively used. On the contrary, if the compilation function of the "image capture module" contract sends back a double boolean ("1" for the SDR module and "0" for the HDR module), the smart contract of the "connected camera" composite resource understands that it is able to use the "image capture module" resource, but only for the "SDR" and may therefore itself transmit this information to the invoker (i.e. the connected camera).

Other Features and Advantages

In one alternative (or additional) implementation of the technique described above, the phase for obtaining an authorization (P011) and the phase for implementing the action (P012) are modified so as to make it possible to verify the requesting entity.

More particularly, as regards the query phase (P011), the modification operated takes in the modification parameters of the query transmitted to the blockchain: the parameters are completed and they comprise the action required by the requesting entity (i.e. "use" for example, such as described above) and a parameter for identifying (or authenticating depending on the operational implementation conditions) the requesting entity. In one embodiment, this parameter is obtained by the application of a cryptographic function FCrypt (for example AES, 3DES, Blowfish, Twofish, etc.) on a pair formed by a key Ka, for example symmetric, provided earlier to the requesting entity and on complementary data DCP (a random number rnd, at the disposal of the requesting entity, or any other suitable data, such as session data for example, or also context data—i.e. GPS position of the requesting entity, IP address, etc.). Thus, in addition to the action, the requesting entity provides, to the composite contract, the certification data:

C=FCrypt(Ka,DCP)

Obtaining the authorization to implement the action is carried out as previously presented, by cascading the authorization requests to the various unitary contracts or to the agglomeration contracts. In addition to these steps, the composite contract inserts, into the blockchain, a transaction on behalf of the requesting entity with the "C" certification data received during the query.

The phase for implementing the resource (P012), for its part, comprises, such as in the case described above, transmitting, by the requesting entity, an implementation query to the composite resource. This query comprises the action required by the requesting entity (as well as the other data described above) and the complementary data DCP previously used in the query phase.

Upon receipt of this query, the composite resource queries its composite contract within the blockchain. Depending on the parameters transmitted (particularly for example the identifier of the requesting entity and optionally the result received (resp)), it returns an implementation acceptance or rejection result particularly comprising the "C" certification data provided by the requesting entity in the query phase (P011). Optionally, the composite contract inscribes a transaction (relating to this acceptance result) in the blockchain. The "C" certification data may also be obtained via a simple query of the blockchain by the composite resource without it needing to use its smart contract.

After this query, the composite resource also carries out a verification that the requesting entity is in fact what it claims to be, with the aid of its possession of the symmetric key Ka, and of the complementary data DCP provided by the requesting entity during the transmission of the implementation query. The composite resource computes its own version of the certification data and compares this version with the certification data obtained from the blockchain. When the two certification data are identical, the composite resource executes the action that has been requested.

Thus, in this alternative (or this additional) implementation, the composite resource (the smart contract of which is published on the blockchain), after executing an authorization request query phase such as described above (that is to say an authorization request received from the entity that wants to implement the resource), verifies that this authorization has effectively been granted beforehand and confirms that this authorization has been granted to the composite resource, which thereby implements the action required by the requesting entity.

In concrete terms, the entity that wants to implement the resource obtained a response from the smart contract of the composite resource, such as described above. In the implementation phase, rather than transmit this response with its action query to the composite resource, the entity transmits its action query accompanied with authentication data that is specific to it. Upon receipt of this query, the composite resource transmits, to its smart contract of the blockchain, a query in the aim of knowing if its smart contract has authorized the entity. This transmission of this query is accompanied with the authentication data of the requesting entity. The smart contract of the composite resource transmits its response (for example a boolean response) to the composite resource. The composite resource then verifies the result obtained and authorizes or not its own implementation.

For implementing the requested action, the composite resource may also base itself on obtaining data external to the blockchain. It is thus possible to condition the implementation of a particular action not only from conditions from the composition of the composite resources, such as inscribed within the blockchain, but also conditions external to the blockchain.

Regardless of the embodiments, it is moreover possible to limit the use of a composite contract. More particularly we have, in the composite contract, a field, initially of zero value. During the querying of the composite contract by an entity, the first action taken by the composite contract is to verify the value of this field. If this value is zero, the contract is executed normally, according to the method presented above. If this value is not zero, then this value is the address to which the contract must make reference. The composite contract then launches the execution of another contract (composite) that is at this address and the process continues such as explained above. This method makes it possible to neutralize the composite contracts in the blockchain itself. More particularly, when a composite contract may no longer be referenced, and insofar as it is not possible to modify (the executable code of) this composite contract, this updating of value makes it possible to no longer permit the execution of this contract.

Implementation System

In relation with FIG. 3, a system for implementing the technique proposed by the inventors is described. Such a system comprises a blockchain (BC) distributed in a plurality of nodes (nds1, etc., ndsX), at least one of these nodes of the blockchain being accessible by a requesting entity (ENT), via a communication network (Ntwk). A node is in the form of a computing electronic device, having data-processing resources, particularly in terms of processing for maintaining at least one portion of the blockchain, and for being able if applicable to inscribe or validate the inscription of transactions within this blockchain, and particularly inscribe or validate the insertion of associated contracts and tokens in to the blockchain. Thus, each node comprises an electronic module comprising a memory, a processing unit equipped for example with a microprocessor, and controlled by a computer program. The invoker also has technical modules making it possible to obtain implementation authorization. It comprises a memory, a processing unit equipped for example with a microprocessor, and controlled by a computer program. Moreover, these devices also comprise communication means that are for example in the form of network components (WiFi, 3G/4G/5G, wired) that make it possible for the devices to receive data coming from entities connected to one or more communication networks and transmit processed data to such entities. The system also comprises at least one composite resource (RC), which may optionally be integrated within the entity, and which is able to communicate, either by its own means or by shared means (for example with the requesting entity) with a communication network.

The invention claimed is:

1. A method of determining an authorization to implement a composite resource, the composite resource comprising at least two resources, wherein the at least two resources are hardware resources or software resources or mixed resources combining hardware resources and software resources, the method being implemented within a blockchain, wherein the method comprises:

- receiving, by a smart contract of the blockchain, referred to as a composite contract, a query coming from a requesting entity desiring to obtain an authorization to implement the composite resource;
- obtaining, by the composite contract, at least two addresses of at least two smart contracts within a blockchain, each smart contract being associated with at least one resource among the at least two resources included in the composite resource, wherein the composite smart contract is configured to activate the at least two smart contracts, thereby forming a hierarchy tree of smart contracts within the blockchain; and, for each smart contract:
  - transmitting a query for authorization to implement the resource associated with this smart contract;
  - receiving a result provided by this smart contract, the result being representative of the authorization to implement the resource; and
  - compiling results coming from the at least two smart contracts delivering a result representative of the authorization to implement the composite resource.

2. The method according to claim 1, wherein the method comprises prior to receiving the query, inserting, within at least one blockchain, the at least one smart contract and the composite contract addressing the at least one smart contract.

3. The method according to claim 1, wherein the query coming from the requesting entity comprises at least one data representative of an action that the requesting entity wants the composite resource to implement.

4. The method according to claim 1, wherein the query coming from the requesting entity comprises at least one data representative of "C" certification data.

5. The method according to claim 4, wherein the method further comprises inserting, within the blockchain of the composite contract, a transaction comprising the "C" certification data.

6. The method according to claim 4, wherein the "C" certification data is the result of a cryptographic function applied on a symmetric key and on data in possession of the requesting entity.

7. The method according to claim 1, wherein the method comprises, after obtaining, by the requesting entity, the result representative of the authorization to implement the composite resource, transmitting, by the requesting entity, an implementation query to the composite resource, taking into account the result representative of the authorization to implement the composite resource.

8. The method according to claim 1, wherein the method comprises, after transmitting the result representative of the authorization to implement the composite resource to the requesting entity:

receiving, by the blockchain, coming from the composite resource, a query for obtaining implementation authorization data;

and, when such implementation authorization data is present within the blockchain, transmitting the implementation authorization data to the composite resource.

9. A blockchain comprising at least one processor configured to determine an authorization to implement a composite resource, the composite resource comprising at least two resources, wherein the at least two resources are hardware resources or software resources or mixed resources combining hardware resources and software resources, wherein the at least one processor is further comprised to:

receive, by a smart contract of the blockchain, referred to as a composite contract, a query coming from a requesting entity desiring to obtain an authorization to implement the composite resource;

obtain, by the composite contract, at least two addresses of at least two smart contracts within a blockchain, each smart contract being associated with at least one resource among the at least two resources included in the composite resource, wherein the composite smart contract is configured to activate the at least two smart contracts, thereby forming a hierarchy tree of smart contracts within the blockchain; and, for each smart contract:

transmit a request for authorization to implement the resource associated with this smart contract;

receive a result provided by this smart contract, the result being representative of the authorization to implement the resource; and compile results coming from the at least two smart contracts delivering a result representative of the authorization to implement the composite resource.

10. A non-transitory computer readable medium comprising a computer program, which when executed by a processor of a digital device, configures the digital device to implement a method for determining an authorization to implement a composite resource, the composite resource comprising at least two resources, wherein the at least two resources are hardware resources or software resources or mixed resources combining hardware resources and software resources, the method comprising:

receiving, by a smart contract of the blockchain, referred to as a composite contract, a query coming from a requesting entity desiring to obtain an authorization to implement the composite resource;

obtaining, by the composite contract, at least two addresses of at least two smart contracts within a blockchain, each smart contract being associated with at least one resource among the at least two resources included in the composite resource, wherein the composite smart contract is configured to activate the at least two smart contracts, thereby forming a hierarchy tree of smart contracts within the blockchain; and, for each smart contract:

transmitting a query for authorization to implement the resource associated with this smart contract;

receiving a result provided by this smart contract, the result being representative of the authorization to implement the resource; and compiling results coming from the at least two smart contracts delivering a result representative of the authorization to implement the composite resource.

* * * * *